United States Patent
Fugitt et al.

(10) Patent No.: US 9,732,473 B2
(45) Date of Patent: Aug. 15, 2017

(54) BASECOAT AND ASSOCIATED PAPERBOARD STRUCTURE

(71) Applicant: WestRock MWV, LLC, Norcross, GA (US)

(72) Inventors: Gary P. Fugitt, Rockville, VA (US); Steven G. Bushhouse, Quinton, VA (US); Jason R. Hogan, Glen Allen, VA (US); Wei-Hwa Her, Beaumont, TX (US)

(73) Assignee: WestRock MWV, LLC, Norcross, GA (US)

( * ) Notice: Subject to any disclaimer, the term of this patent is extended or adjusted under 35 U.S.C. 154(b) by 43 days.

(21) Appl. No.: 14/946,272

(22) Filed: Nov. 19, 2015

(65) Prior Publication Data
US 2016/0076202 A1     Mar. 17, 2016

Related U.S. Application Data

(63) Continuation of application No. 13/404,151, filed on Feb. 24, 2012, now abandoned, which is a
(Continued)

(51) Int. Cl.
*C09C 1/02* (2006.01)
*D21H 19/44* (2006.01)
(Continued)

(52) U.S. Cl.
CPC ........... *D21H 19/44* (2013.01); *C09C 1/0081* (2013.01); *C09C 1/021* (2013.01); *C09C 1/42* (2013.01);
(Continued)

(58) Field of Classification Search
CPC .............. C01P 2004/20; C01P 2004/54; C01P 2004/61; C09C 1/0081; C09C 1/021;
(Continued)

(56) References Cited

U.S. PATENT DOCUMENTS

1,913,329 A   6/1933   Bradner
3,963,843 A   6/1976   Hitchmough et al.
(Continued)

FOREIGN PATENT DOCUMENTS

EP   0448332    9/1991
JP   01118692   5/1989
(Continued)

OTHER PUBLICATIONS

Z. Richard Zhang, Roger W. Wygant, Anthony V. Lyons and Frank A. Adamsky, "How Coating Structure Relates to Performance in Coated SBS Board: A Fundamental Approach," 1999 Tappi Coating Conference, May 1999.
(Continued)

*Primary Examiner* — Shuangyi Abu Ali
(74) *Attorney, Agent, or Firm* — WestRock Intellectual Property Group

(57) ABSTRACT

A basecoat including a pigment blend that includes a ground calcium carbonate component and a hyperplaty clay component, wherein the ground calcium carbonate component has a coarse particle size distribution, and wherein the hyperplaty clay component has an average aspect ratio of at least 40:1.

18 Claims, 10 Drawing Sheets

Related U.S. Application Data continuation of application No. 12/326,430, filed on Dec. 2, 2008, now Pat. No. 8,142,887.

(60) Provisional application No. 61/038,579, filed on Mar. 21, 2008.

(51) Int. Cl.

| C09C 1/00 | (2006.01) |
|---|---|
| C09C 1/42 | (2006.01) |
| C09D 5/02 | (2006.01) |
| C09D 17/00 | (2006.01) |
| D21H 11/04 | (2006.01) |
| D21H 17/63 | (2006.01) |
| D21H 17/67 | (2006.01) |
| D21H 17/69 | (2006.01) |
| D21H 19/36 | (2006.01) |
| D21H 19/38 | (2006.01) |
| D21H 19/40 | (2006.01) |
| D21H 23/30 | (2006.01) |
| D21H 25/00 | (2006.01) |
| G01F 17/00 | (2006.01) |

(52) U.S. Cl.
CPC ........... *C09D 5/028* (2013.01); *C09D 17/004* (2013.01); *D21H 11/04* (2013.01); *D21H 17/63* (2013.01); *D21H 17/67* (2013.01); *D21H 17/675* (2013.01); *D21H 17/69* (2013.01); *D21H 19/36* (2013.01); *D21H 19/38* (2013.01); *D21H 19/385* (2013.01); *D21H 19/40* (2013.01); *D21H 23/30* (2013.01); *D21H 25/005* (2013.01); *G01F 17/00* (2013.01); *C01P 2004/20* (2013.01); *C01P 2004/54* (2013.01); *C01P 2004/61* (2013.01); *Y10T 428/24901* (2015.01); *Y10T 428/25* (2015.01)

(58) Field of Classification Search
CPC ........ C09C 1/42; C09D 17/004; C09D 5/028; D21H 11/04; D21H 17/63; D21H 17/67; D21H 17/675; D21H 17/69; D21H 19/36; D21H 19/38

See application file for complete search history.

(56) References Cited

U.S. PATENT DOCUMENTS

| 4,749,445 A | 6/1988 | Vreeland |
| 4,888,983 A | 12/1989 | Dunfield et al. |
| 5,284,813 A | 2/1994 | Heyer |
| 5,298,335 A | 3/1994 | Reed et al. |
| 5,320,672 A | 6/1994 | Whalen-Shaw |
| 5,576,617 A | 11/1996 | Webb et al. |
| 5,631,080 A | 5/1997 | Fugitt |
| 5,690,527 A | 11/1997 | Rutledge et al. |
| 6,238,473 B1 | 5/2001 | Maxwell et al. |
| 6,582,553 B2 | 6/2003 | Jewell et al. |
| 6,777,075 B2 | 8/2004 | Concannon et al. |
| 6,802,938 B2 | 10/2004 | Mohan et al. |
| 6,866,906 B2 | 3/2005 | Williams et al. |
| 6,919,111 B2 | 7/2005 | Swoboda et al. |
| 7,208,039 B2 | 4/2007 | Jones et al. |
| 7,306,668 B2 | 12/2007 | Pring et al. |
| 7,425,246 B2 | 9/2008 | Urscheler |
| 7,504,002 B2 | 3/2009 | Brelsford et al. |
| 7,806,978 B2 | 10/2010 | Pruett et al. |
| 8,142,887 B2 | 3/2012 | Fugitt et al. |
| 2003/0085012 A1 | 5/2003 | Jones et al. |
| 2004/0065423 A1 | 4/2004 | Swerin et al. |
| 2004/0229063 A1 | 11/2004 | Concannon et al. |
| 2005/0039871 A1 | 2/2005 | Urscheler et al. |
| 2005/0247418 A1* | 11/2005 | Jones ................ C09C 1/42 162/135 |
| 2006/0009566 A1 | 1/2006 | Jones et al. |
| 2006/0124033 A1 | 6/2006 | Pruett et al. |
| 2006/0169174 A1 | 8/2006 | Sare et al. |
| 2007/0169902 A1 | 7/2007 | Brelsford et al. |
| 2008/0060774 A1 | 3/2008 | Zuraw et al. |
| 2008/0311416 A1 | 12/2008 | Kelly et al. |
| 2009/0239047 A1 | 9/2009 | Fugitt et al. |
| 2009/0297808 A1 | 12/2009 | Fugitt et al. |
| 2012/0145040 A1 | 6/2012 | Fugitt et al. |

FOREIGN PATENT DOCUMENTS

| JP | 2009001953 | 1/2009 |
| JP | 2009013513 | 1/2009 |
| WO | WO9851860 | 11/1998 |
| WO | WO0114014 | 3/2001 |
| WO | WO2006033952 | 3/2006 |
| WO | WO2009091406 | 7/2009 |

OTHER PUBLICATIONS

Z. Richard Zhang, Roger W. Wygant and Anthony V. Lyons, "A Fundamental Approach to Understand the Relationship Between Top Coat Structure and Paper Performance," TAPPI Journal, vol. 84, No. 3, Mar. 2001.

R.W. Wygant, "Coating Pigment Formulation Selection to Optimize the Quality of Matte Lightweight-Coated Paper," 2003 Tappi Spring Technical Conference, May 2003.

R.W. Wygant, "Multi-Pigment Formulations Contribute to the Rise of Matte LWC: formulations for matte coatings in acid systems have been developed and tested," TAPPI Solutions! for People, Process, and Paper, May 2003.

R.W. Wygant, "Coating Formulation Optimization," 2004 TAPPI Coating and Graphic Arts Conference, May 2004.

Robert J. Pruett, Jun Yuan, Bomi M. Bilimoria, Roger W. Wygant and Anthony V. Lyons, "Fine Platy Kaolin Composition," European Patent EP1587882, Jul. 22, 2004.

Richard Gagnon, Jan Walter, Joel Kendrick, Rajan Iyer, Leslie Mclain, Roger Wygant, "Metered Size Press Coating Formulation Design for Fiber Reduction," TAPPI 2007 Coating and Graphics Arts Conference, Miami, FL, USA, Apr. 2007.

Roger Wygant, Richard Gagnon, Joel Kendrick, Jan Walter, "Fiber Savings Through New MSP Formulation Strategies," Pulp and Paper, Nov. 2007.

Wygant, J. Kendrick, J. Walter, "Metered Size Press Pigmentation for Fiber Reduction," TAPPI 2008 Coating and Graphic Arts Conference, Dallas, TX, May 2008.

Benny Hallam, Chris Nutbeem, Tatsuya Asano, "Optimisation of Steep Carbonate Coating Formulations With Ultra Fine Platy Kaolin," Tappi Coating and Graphic Arts Conference, Miami, May 2007.

Preston J.S., Toivakka M., Heard P.J., "Visualisation, Modelling and Image Analysis of Coated Paper Microstructure: Particle Shape-Microstructure Interrelations" Proc. 2nd IPEC Conference Tianjin China May 9-11 pp. 833-839 (Date Unknown).

Preston J.S., Husband J.C., Norouzi N., Blair D., Heard P., "The Measurement and Analysis of the Distribution of Fountain Solution in Kaolin and Calcium Carbonate Coatings" Proc 2008 Tappi PaperCon, Dallas Tx May 4-7, 2008.

J.C.Husband, J.S.Preston, L.F.Gate, A.Storer and P.Creaton, "A Study of In-Plane and z-direction Strength of Coating Layers with varying Latex Content," 6th International Paper and Coating Chemistry Symposium, Stockholm, Jun. 7-9, 2006, published in TAPPI J., 6, 12, 10-16, 2008.

Preston J.S., Hiorns A.G., Heard P., Parsons D.J., "Design of coating structure for flexographic printing" Proc. 2007 Tappi Coating Conference, Miami Apr. 7.

Husband J.C., Preston J.S., Gate L.F., Blair D., Creaton P.,"Factors affecting the printing strength of kaolin based coatings" Proc. 2007 Tappi Coating Conference, Miami Apr. 7.

(56) References Cited

OTHER PUBLICATIONS

Preston J.S., Nutbeem C., Heard P.J., Wygant R., "Coating Structure Requirements for Improved Rotogravure Printability and Reduced Ink Demand" Tappi Int Printing and Graphic Arts Cont, Cincinnati, Sep. 20-22, 2006.

Elton N.J., Preston J.S., "Polarized light reflectometry for studies of paper coating structure—Part II. Application to coating structure, gloss and porosity" Tappi Journal Aug. 2006, vol. 5, No. 8, pp. 10-16.

Dr. Sanna Rousu, Dr. Janet Preston, Jan Gustafsson, Dr. Peter Heard, "Interactions between UV Curing, hybrid-UV and sheetfed Offset Inks and Coated Paper—Part 2 Commercial print trials" TAGA Journal, vol. 2, Edition 3, Apr. 2006, pp. 174-189.

Dr. Janet Preston, Dr. Sanna Rousu, Dr. Roger Wygant, Mr. John Parsons, Dr. Peter Heard, "Interactions between UV curing offset inks and coated paper—Part 1 Laboratory Investigations" TAGA Journal, vol. 2, Edition 2, Nov. 2005, pp. 82-98.

Hiorns A.G., Preston J.S., "Optimization of Coating, Paper Key to Blade and MSP Coater Use" Pulp and Paper, Jul. 2005 vol. 79, No. 7 pp. 44-47.

C. Nutbeem, J.C. Husband and J.S. Preston, "The role of pigments in controlling coating structure" 2005 PITA coating conf Bradford.

Preston J., Hiorns T.K, Husband J., Nutbeem C., "Overview of coating structure and influence of applicator type," Location and Date Unknown.

Preston J.S., Daun M., Nutbeem C., Jones A., "Attaining print performance through pigment engineering," Presented at the 1999 PTS Coating Conference Munich Sep. 1999.

Preston J.S., Nutbeem C., Parsons D.J., Jones A., "The printability of coated papers with controlled microstructures," Presented at the 1999 PITA. Conference, Edinburgh.

Brociner, R.E. and Beazley, K.M., "The influence of the coating pigment on missing dots in LWC gravure paper," TAPPI J., 63 (5):55 (1980).

Elton, N.J., Gate, L.F., Hooper, J.J., "Texture and orientation of kaolin in coatings," Clay Minerals, 34, 89-98 (1999).

Adams, J.M., "Particle size and shape effects in materials science: examples from polymer and paper systems," Clay Minerals, 28, 509-530 (1993).

J.C.Husband and A.V.Lyons, "Engineered Coating Clays for Future Needs," 7th International Conference on New Available Technologies, Jun. 4-6, 2002, Stockholm. Proceedings p. 191-195. Published by SPCI.

J.C.Husband, J.S.Preston, L.F.Gate, A.Storer and P.Creaton, "The Influence of Pigment Particle Shape on the In-plane Tensile Strength Properties of Kaolin-based Coating Layers," TAPPI Advanced Coating Fundamentals Symposium, Turku, Feb. 8-10, 2006. Published in Conference Proceedings, p. 67-80, and in TAPPI J., 5, 12, 3-8, 2006.

J.C.Husband, J.S. Preston, L.F.Gate, P.Creaton and D. Blair, "Factors Affecting the Printing Strength of Kaolin-based Paper Coatings," TAPPI Coating Conference, Miami, Apr. 22-25, 2007. Published in Conference Proceedings, and in TAGA J., 4, p. 84-100 (2008).

J.C.Husband, "Use of High Aspect Ratio Kaolin as a tool to Control the Strength and Stiffness Properties of Coated Paper," 50th Japan TAPPI Annual Meeting, Takamatsu, Oct. 10-12, 2007. Published in Japan TAPPI Journal, Jun. 2008.

J.S. Preston, J.C. Husband, N. Norouzi, D. Blair and P.J. Heard, "The Measurment and Analysis of the Distribution of Fountain Solution in Kaolin and Calcium Carbonate Containing Coatings," TAPPI Coating Conference, Dallas, May 4-7, 2008. Published in Conference Proceedings.

Hliorns A.G., Preston J.S. and Fogelholm R., "The role of the base paper in controlling MSP and Spray LWC paper quality," PITA Coating Conference, Bradford, Mar. 2005.

Preston J.S. and Hiorns A.G., "A comparison of LWC papers produced using Blade and MSP coaters," Paper Technology, vol. 45, No. 6, Jul. 2004.

Drage, P.G.; Hiorns, A.G.; Parsons, D.J.; Coggon, L., "Factors governing print performance in offset printing of matte papers," PTS Coating Symposium, Munich, Sep. 1997.

Hiorns, A.G.; Sharma, S., "Possibilities for upgrading woodcontaining papers by coating with a metered size-press," Pulp and Paper Canada, 97:2, 1996.

Hiorns, A.G., Drage. P.G., "Surface quality enhancement by selective pigmentation," 10th PTS Symposium of Papermaking, Munich, Sep. 1992.

Hiorns A.G., Kent, D.F, Parsons D.J. and Underwood J., "Enhanced performance through multilayer coating," TAPPI Coating Conference, Toronto, Apr. 2005.

Hiorns A.G. and Winter H., "Effect of kaolin addition to calcium carbonate precoats: Part 2—MSP coating," TAPPI Coating Conference, Baltimore, May 2004.

Hiorns A.G. and Eade T., "Particle packing of blocky and platey pigments—A comparison of computer simulation and experimental results," TAPPI Advanced Coating Fundamentals Symposium, Chicago, May 2003.

Hiorns A.G. and Eade T., "Effect of kaolin addition to calcium carbonate precoats," TAPPI Spring Technical Conference, Chicago, May 2003.

Hiorns, A.G., "Calendering response of calcium carbonates in double coated woodfree paper," TAPPI Coating Conference, San Diego, May 2001.

Hiorns, A.G., "Producing LWC rotogravure paper on a metered size press," TAPPI Metered Size Press Forum III, Washington DC, Apr. 2000.

Hiorns, Anthony et al., "Effects of Kaolin Addition to Calcium Carbonate Precoats: Part 2: MSP Coating," TAPPI Coating Conference, Baltimore, Maryland (May 2004).

Office Action, U.S. Appl. No. 12/412,773 (Sep. 29, 2009).

International Search Report and Written Opinion for PCT/US2009/000467, mailed Aug. 25, 2009.

* cited by examiner

BASECOAT AND ASSOCIATED PAPERBOARD STRUCTURE

PRIORITY

This application is a continuation of U.S. Ser. No. 13/404,151 (pending), which is a continuation of U.S. Ser. No. 12/326,430 filed on Dec. 2, 2008, now U.S. Pat. No. 8,142,887 which claims priority from U.S. Ser. No. 61/038,579 (expired) filed on Mar. 21, 2008. The entire contents of all three priority applications are incorporated herein by reference.

FIELD

The present patent application is directed to coatings for paperboard and, more particularly, to basecoats as well as smooth paperboard structures formed with the disclosed basecoats.

BACKGROUND

Paperboard is used in various packaging applications. For example, aseptic liquid packaging paperboard is used for packaging beverage cartons, boxes and the like. Therefore, customers often prefer paperboard having a generally smooth surface with few imperfections to facilitate the printing of high quality text and graphics, thereby increasing the visual appeal of products packaged in paperboard.

Conventionally, paperboard smoothness is achieved by a wet stack calendering process in which the paperboard is rewetted and passed through a calendering device having two or more hard rolls. The wet stack calendering process smoothes the paperboard by compressing the fiber network to reduce the pits and crevices in raw stock paperboard (see FIG. 1). The result is a smooth paperboard with reduced board thickness and bulk and, therefore, reduced stiffness. However, stiffness is an important requirement for many paperboard applications, such as aseptic liquid packaging paperboard. Therefore, preparing a smooth yet stiff paperboard using the conventional wet stack calendering process requires increasing the basis weight of the paperboard, thereby substantially increasing the raw material cost.

Alternatively, manufacturers have attempted to smooth the surface of paperboard by coating the entire surface of the paperboard with a basecoat comprised of various pigments, such as clay, calcium carbonate, TiO.sub.2 and the like, then overcoating this base with a second and sometimes even a third coating, which is generally referred to as a topcoat. It was discovered that high quantities of relatively fine pigment particles applied to the surface of paperboard provided a more smooth surface without the need for wet stack calendering, thereby maintaining bulk. For example, as shown in FIG. 2, it was discovered that relatively high quantities (e.g., 10.6 pounds per 3000 ft.sup.2 or more) of relatively fine ground calcium carbonate, such as CARBITAL®95 (Imerys Pigments, Inc. of Roswell, Ga.), applied to the rough surface of paperboard provided the greatest smoothness. Indeed, it has been understood that the more pigment applied to the surface of the paperboard the better the resulting smoothness. However, the use of relatively high quantities of pigments substantially increases the cost of preparing smooth and highly printable paperboard.

Accordingly, there is a need for a basecoat and associated paperboard structure that maintains paperboard bulk and provides the desired smoothness for high quality printing, while reducing manufacturing cost.

SUMMARY

In one aspect, the disclosed basecoat may include a pigment blend of a coarse ground calcium carbonate and a hyperplaty clay having an average aspect ratio of at least about 40:1.

In another aspect, a paperboard substrate may be coated with the disclosed basecoat to form a coated paperboard structure.

Other aspects of the disclosed basecoat and associated paperboard structure will become apparent from the following description, the accompanying drawings and the appended claims.

DETAILED DESCRIPTION

Figure 1:
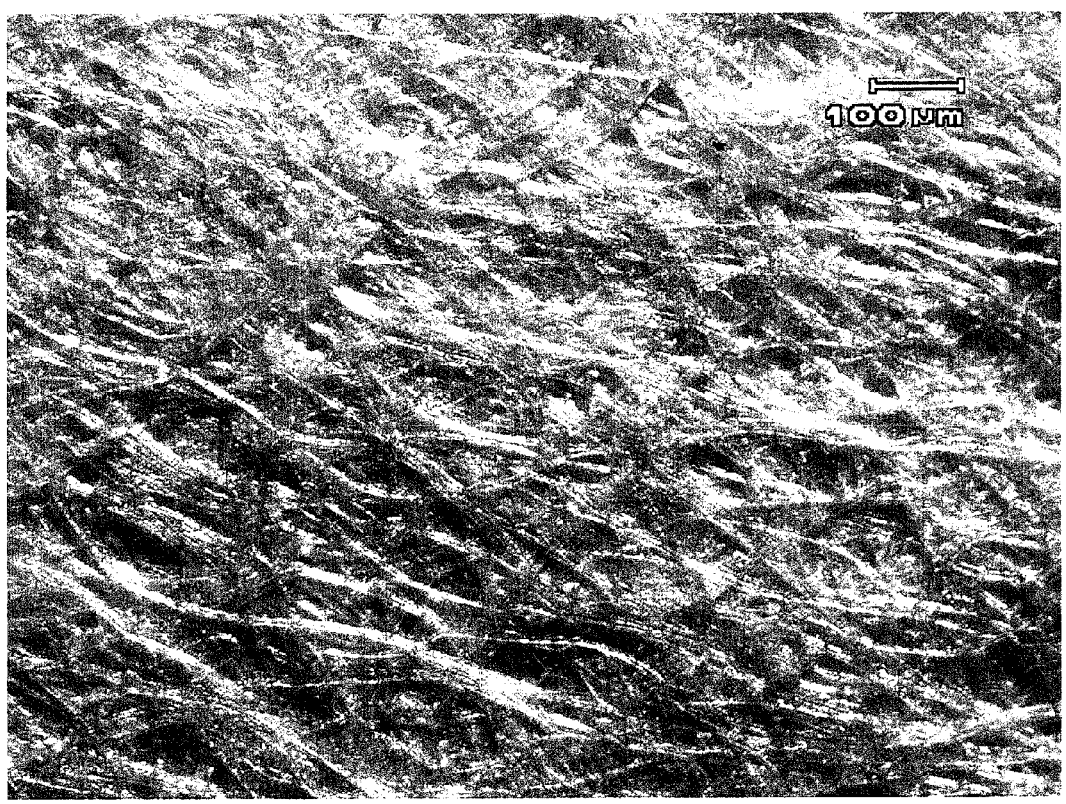
FIG. 1 is a photograph of an uncoated surface of an exemplary paperboard substrate (i.e., raw stock)

In one aspect, the disclosed basecoat may include a pigment blend of high aspect ratio clay and calcium carbonate. The pigment blend may be dispersed in a carrier, such as water, to facilitate application of the basecoat to an appropriate substrate, such as a paperboard substrate. Additional components, such as binders, stabilizers, dispersing agents and additional pigments, may be combined with the pigment blend to form the final basecoat without departing from the scope of the present disclosure.

As used herein, "paperboard substrate" broadly refers to any paperboard material that is capable of being coated with the disclosed basecoat. Those skilled in the art will appreciate that the paperboard substrate may be bleached or unbleached, and typically is thicker and more rigid than paper. Generally, a paperboard substrate has an uncoated basis weight of about 85 pounds per 3000 ft.sup.2 or more.

Examples of appropriate paperboard substrates include corrugating medium, linerboard and solid bleached sulfate (SBS).

The clay component of the pigment blend of the disclosed basecoat may be any platy clay having a relatively high aspect ratio or shape factor (i.e., hyperplaty clay). As used herein, the terms "aspect ratio" and "shape factor" refer to the geometry of the individual clay particles, specifically to a comparison of a first dimension of a clay particle (e.g., the diameter or length of the clay particle) to a second dimension of the clay particle (e.g., the thickness or width of the clay particle). The terms "hyperplaty," "high aspect ratio" and "relatively high aspect ratio" refer to aspect ratios generally in excess of 40:1, such as 50:1 or more, particularly 70:1 or more, and preferably 90:1 or more.

In one aspect, the clay component of the pigment blend may include a platy clay wherein, on average, the clay particles have an aspect ratio of about 40:1 or more. In another aspect, the clay component may include a platy clay wherein, on average, the clay particles have an aspect ratio of about 50:1 or more. An example of such a clay is CONTOUR® 1180 available from Imerys Pigments, Inc. of Roswell, Ga. In another aspect, the clay component may include a platy clay wherein, on average, the clay particles have an aspect ratio of about 90:1 or more. An example of such a clay is XP-6100 also available from Imerys Pigments, Inc. Additional examples of appropriate platy clays are disclosed in U.S. Pat. No. 7,208,039 to Jones et al., the entire contents of which are incorporated herein by reference.

In another aspect, the clay component of the pigment blend may include platy clay having a relatively high average particle size. In one particular aspect, the clay component may have an average particle size of about 4 microns or more. In a second particular aspect, the clay component may have an average particle size of about 10 microns or more. In a third particular aspect, the clay component may have an average particle size of about 13 microns or more.

The calcium carbonate component of the pigment blend of the disclosed basecoat may include a ground calcium carbonate. In one aspect, the calcium carbonate component may include a fine ground calcium carbonate. An example of such a fine ground calcium carbonate is CARBITAL® 95, available from Imerys Pigments, Inc. of Roswell, Ga., wherein about 95 percent of the calcium carbonate particles are less than about 2 microns in diameter. In another aspect, the calcium carbonate component may include a coarse ground calcium carbonate. An example of such a coarse ground calcium carbonate is CARBITAL® 60, also available from Imerys Pigments, Inc., wherein about 60 percent of the calcium carbonate particles are less than about 2 microns in diameter. In another aspect, the calcium carbonate component may include an extra coarse ground calcium carbonate. An example of such an extra coarse ground calcium carbonate is CARBITAL® 35, also available from Imerys Pigments, Inc., wherein only about 35 percent of the calcium carbonate particles are less than about 2 microns in diameter.

In another aspect, the calcium carbonate component of the pigment blend may have an average particle size of about 1 micron or more, such as about 1.5 microns and, more particularly, 3 microns or more.

Without being limited to any particular theory, it is believed that pigment blends that are formulated to provide relatively high percent sediment void volumes (i.e., bulkier particle packing) provide high smoothness at relatively low coat weights, thereby reducing raw material costs. Furthermore, it is believed that using a clay component having a relatively high aspect ratio and/or a relatively high average particle size and a calcium carbonate component having a relatively high average particle size yields relatively high and, therefore, desirable percent sediment void volumes. For example, sediment void volumes in excess of 45 percent may be desired, while sediment void volumes in excess of 47.5 percent may be more desired and sediment void volumes in excess of 50 percent may be even more desired.

One appropriate technique for measuring percent sediment void volume includes preparing a pigment blend sample having the desired weight percentage of the clay component to the calcium carbonate component. The pigment blend sample is then diluted with water to 50 percent by weight solids to provide a slurry. A 70 gram sample of the slurry is placed into a centrifuge tube and spun at about 8000 g for about 90 minutes. The sample is then removed from the centrifuge and the clear supernatant liquid is separated and weighed. The sediment is typically packed densely enough that the supernatant liquid is easy to pour off. Based upon the weight of the water removed, the weight of water still contained in the voids of the sediment may be calculated. Then, using particle densities, the weight of water in the voids may be converted into percent sediment void volume.

Figure 4:
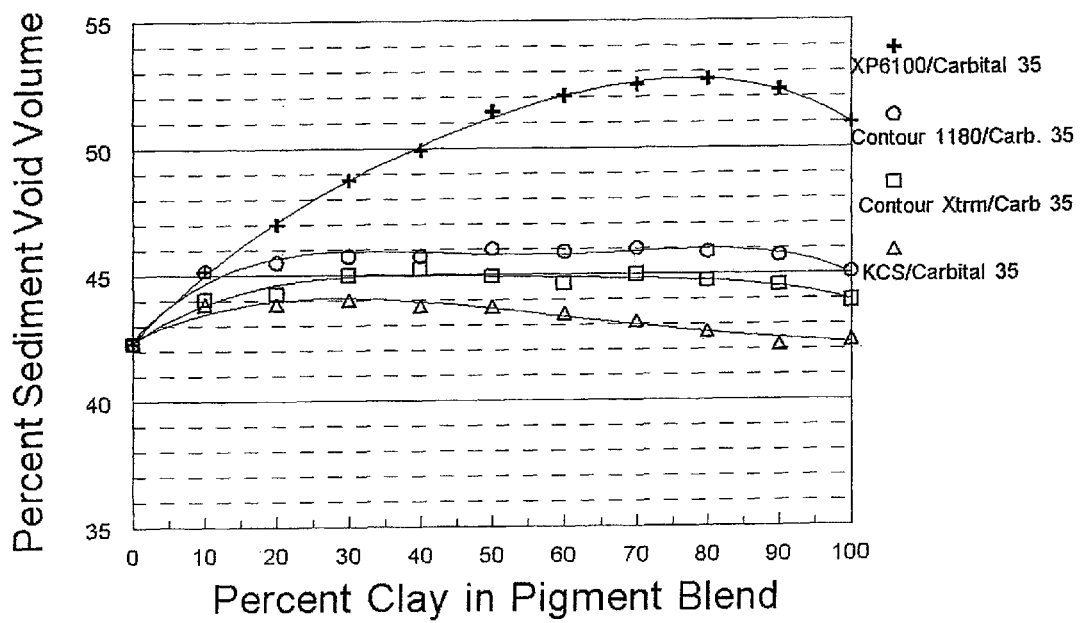
FIG. 4 is a graphical illustration of percent sediment void volume versus percent clay component for various pigment blends formulated with an extra course ground calcium carbonate.
Figure 5:
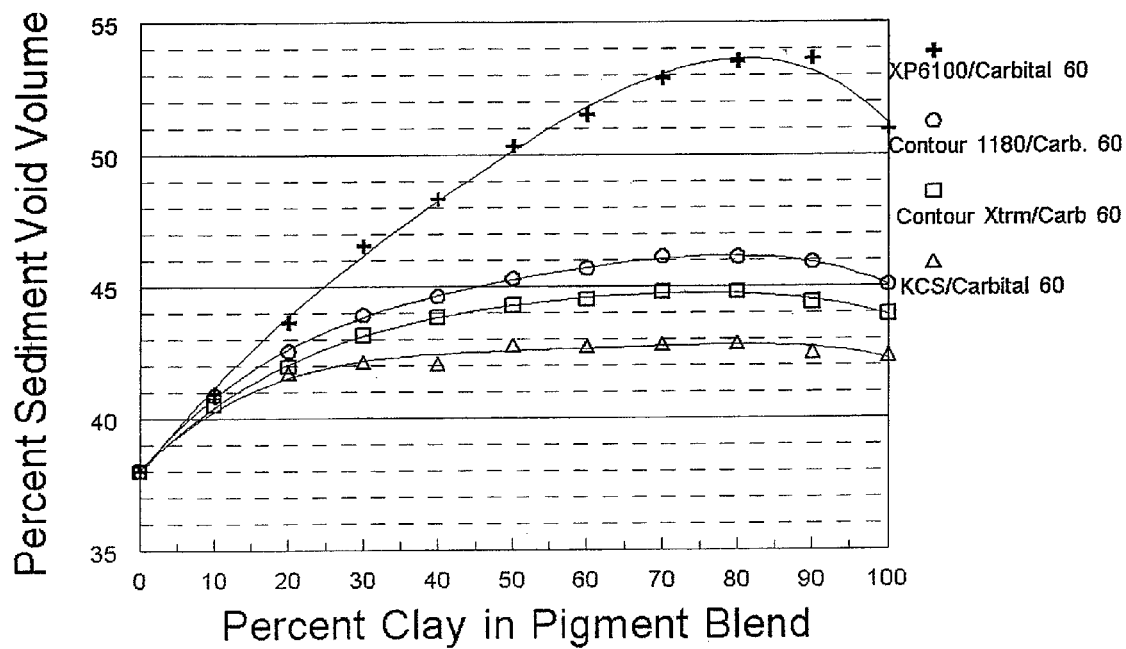
FIG. 5 is a graphical illustration of percent sediment void volume versus percent clay component for various pigment blends formulated with a course ground calcium carbonate.
Figure 6:
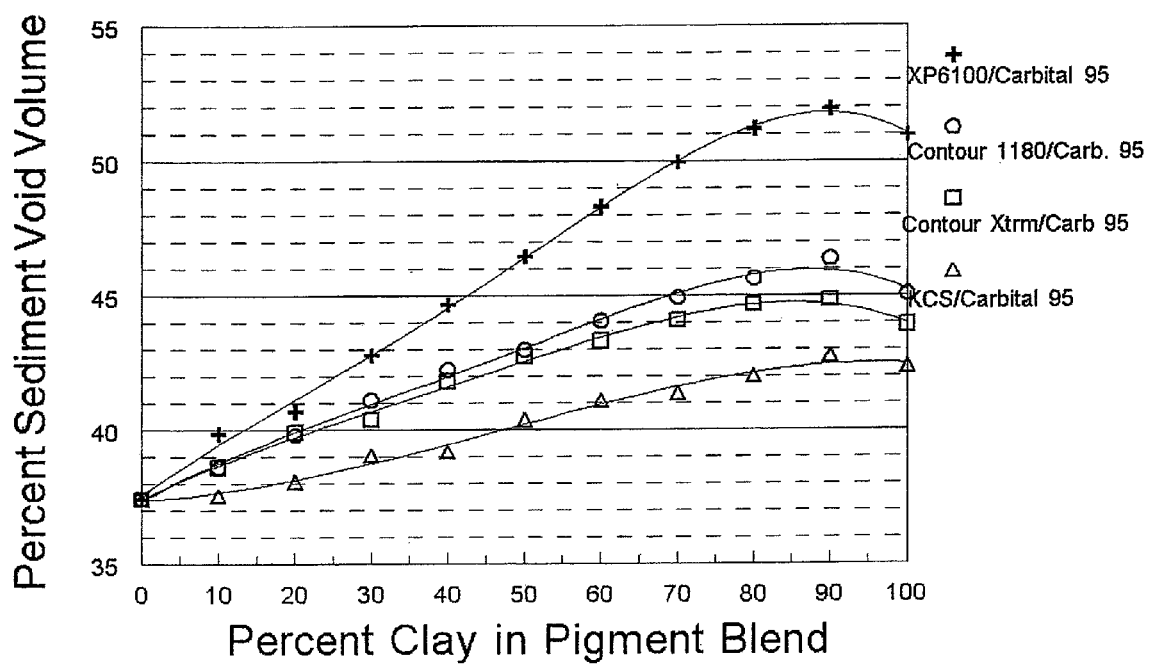
FIG. 6 is a graphical illustration of percent sediment void volume versus percent clay component for various pigment blends formulated with a fine ground calcium carbonate.

Referring to FIGS. 4-6, the percent sediment void volume for various pigment blends versus the percent by weight of the clay component in the pigment blend is provided. Specifically, FIGS. 4-6 compare the use of CARBITAL® 35 (extra coarse), CARBITAL® 60 (coarse) and CARBITAL® 95 (fine) as the calcium carbonate component and XP-6100 (aspect ratio over 90:1), CONTOUR® 1180 (aspect ratio about 50:1), CONTOUR® Xtrm (aspect ratio about 45:1) and KCS (aspect ratio about 10:1 (not a high aspect ratio clay)) as the clay component.

FIGS. 4-6 indicate that coarse ground calcium carbonate (FIGS. 4 and 5), particularly extra coarse ground calcium carbonate (FIG. 4), and high aspect ratio clays, particularly clays having an aspect ratio over 70:1, more particularly over 90:1 (XP-6100 clay), provide the highest percent sediment void volume.

Furthermore, the concave shape of the curves in FIGS. 4-6, particularly the curves associated with XP-6100 clay, indicates that maximum percent sediment void volume is achieved when the clay component is blended with the calcium carbonate component. For example, referring to FIG. 4, when extra coarse ground calcium carbonate and XP-6100 are used, maximum percent sediment void volume occurs between about 60 and about 90 percent by weight of the clay component.

Still furthermore, the concave shape of the curves indicates that certain blends of the clay component and the calcium carbonate component provide a percent sediment void volume that is similar, if not higher, than using 100 percent high aspect ratio clay. Therefore, the curves indicate that blending less expensive calcium carbonate with more expensive high aspect ratio clay may yield an equal, if not superior, coating material in terms of percent sediment void volume. Indeed, comparing FIG. 4 to FIG. 6 for example, the curves indicate that the coarser the calcium carbonate, the less high aspect ratio clay must be used to achieve higher percent sediment void volume. For example, referring to FIG. 4, when extra coarse ground calcium carbonate is blended with XP-6100 clay, a 45:55 blend of the clay component to the calcium carbonate component provides the same percent sediment void volume as 100 percent of the high aspect ratio clay.

Figure 7:
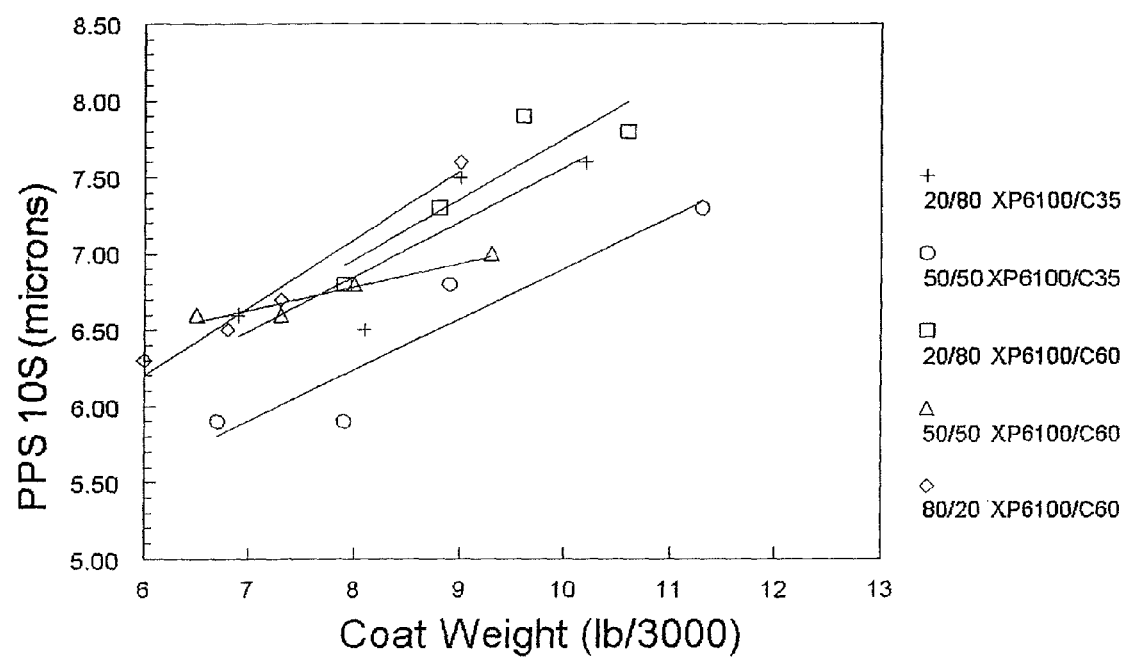
FIG. 7 is a first graphical comparison of Parker Print Surface smoothness versus coat weight.
Figure 8:
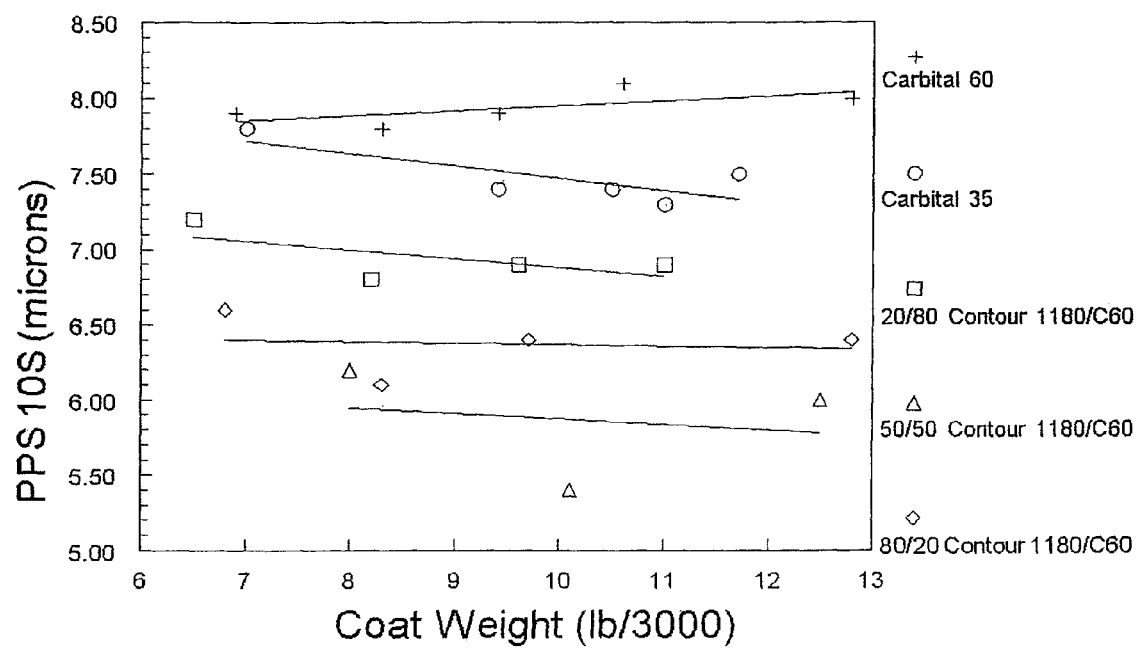
FIG. 8 is a second graphical comparison of Parker Print Surface smoothness versus coat weight.

Referring to FIGS. 7 and 8, the Parker Print Surface ("PPS") smoothness values of paperboard coated with various basecoats on a pilot coater are presented with respect to the coat weight of the basecoat in pounds per ream (3000 ft.sup.2). Those skilled in the art will appreciate that PPS smoothness values taken from samples prepared with a pilot coater are generally higher than the PPS smoothness values obtained from samples prepared on a full scale mill. Nonetheless, the PPS smoothness values taken using a pilot coater are indicative of the improvement provided by the disclosed basecoats over prior art coatings. For reference, when a pilot coater is used, PPS smoothness values of about 7.0 microns or less are generally desired, PPS smoothness values of about 6.5 microns or less are preferred and PPS smoothness values of about 6.0 microns or less are more preferred.

Of particular interest, as shown in FIG. 7, basecoats including coarse or extra course calcium carbonate and high aspect ratio clay, particularly XP-6100 clay, provide relatively high percent sediment void volumes and present PPS smoothness values generally below about 7 microns at coat weights of about 9 pounds per ream or less on a paperboard substrate. Indeed, as shown by the positive slope of the curves in FIG. 7, improved smoothness (i.e., lower PPS smoothness value) of the resulting paperboard is directly correlated to lower coat weights. This data is contrary to the expectations of those skilled in the art, which would expect higher smoothness values at high coat weights.

Indeed, when a full scale mill was used, a basecoat including a 50:50 pigment blend of CARBITAL® 35 (ground calcium carbonate) and XP-6100 (high aspect ratio and high average particle size clay) yielded a PPS smoothness value of about 2 microns at a relatively low coat weight of 6 pounds per ream.

Accordingly, coating substrates such as paperboard with basecoats comprising ground calcium carbonate, particularly coarse or extra course ground calcium carbonate, and high aspect ratio clay, particularly clay having an aspect ratio in excess of about 70:1, more particularly high aspect ratio clay having a relatively high average particle size, yields a smooth paperboard structure without sacrificing bulk, and reduces manufacturing cost by combining more expensive platy clay with less expensive ground calcium carbonate, while requiring surprisingly low coat weights to achieve the desired smoothness.

Furthermore, those skilled in the art will appreciate that the type of high aspect ratio clay selected and the type of ground calcium carbonate selected, as well as the ratio of the clay component to the calcium carbonate component, may be dictated by cost considerations in view of the desired smoothness.

The disclosed basecoats may be applied to the surface of a substrate, such as paperboard (e.g., aseptic liquid packaging paperboard), in a quantity sufficient to fill the pits and crevices in the substrate without the need for coating the entire surface of the substrate. Therefore, the disclosed basecoat together with the disclosed method for applying the basecoat may be used to obtain high surface smoothness with a relatively small quantity of basecoat. Indeed, as discussed above, high surface smoothness may be achieved with an unexpectedly small quantity of the disclosed basecoat.

Figure 9:
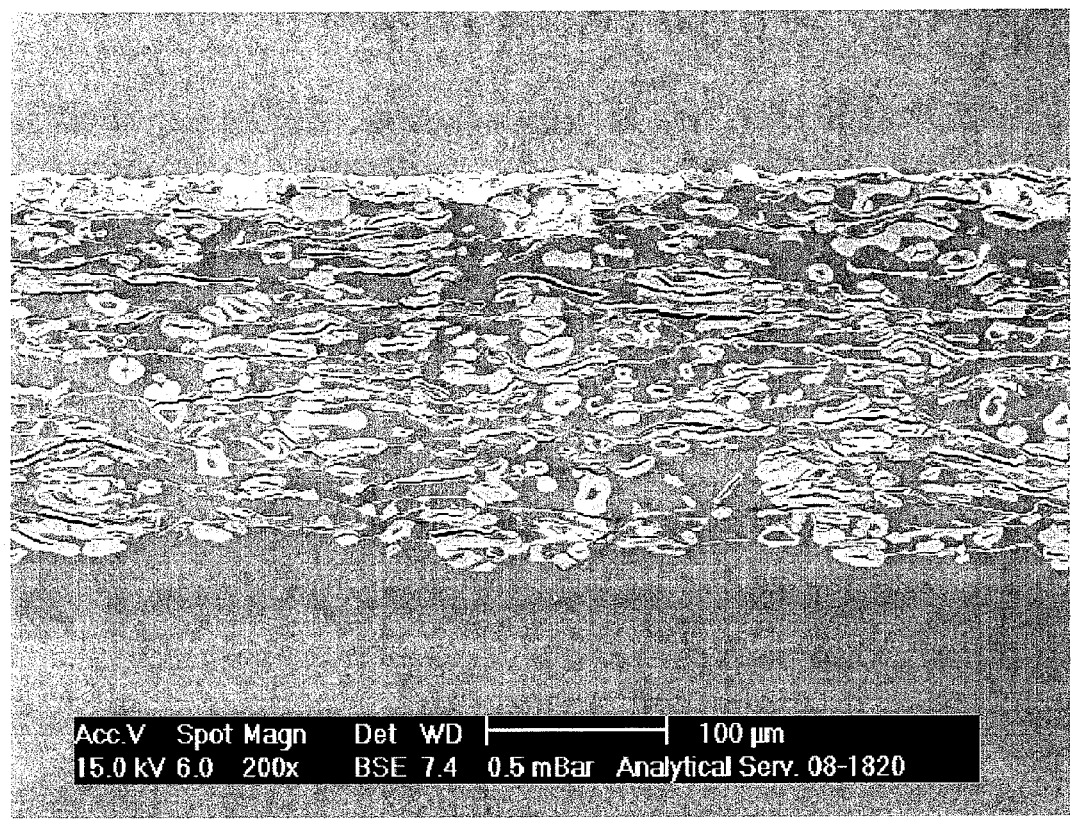
FIG. 9 is a side cross-sectional view of a paperboard substrate coated with the disclosed basecoat according to the disclosed method.
Figure 10:
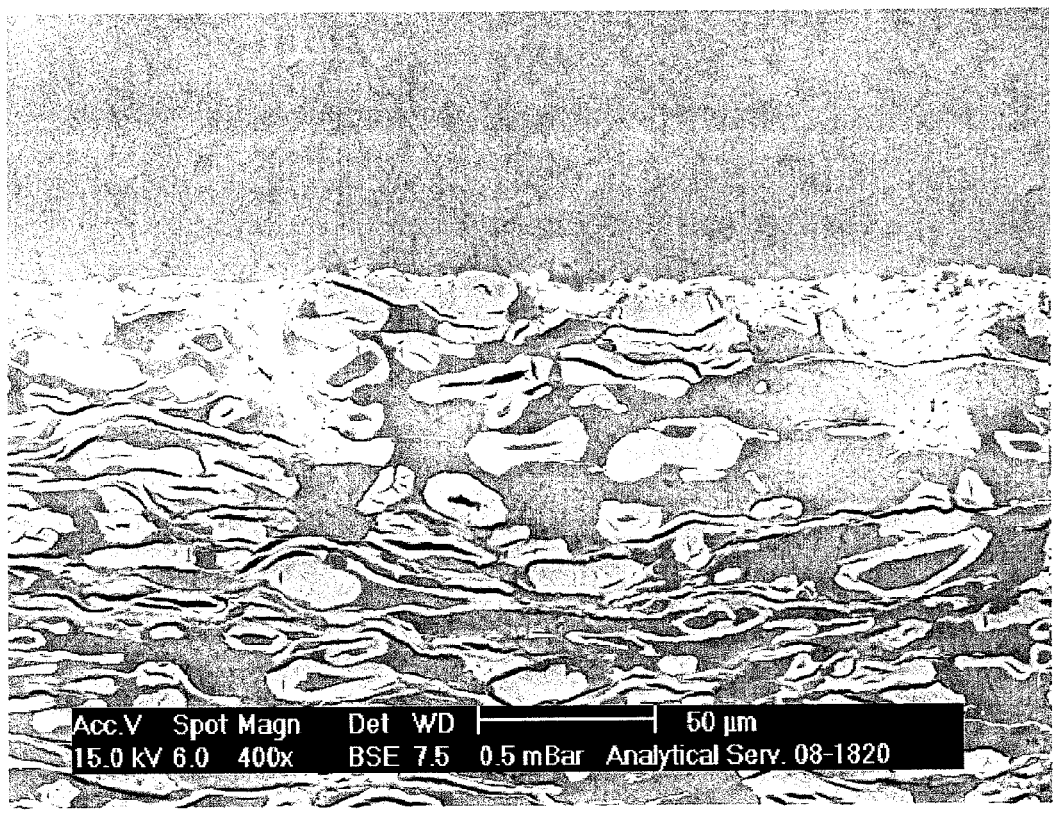
FIG. 10 is a side cross-sectional view of the paperboard substrate of FIG. 9 shown at a second, greater magnification.

In one aspect, the basecoat is applied to the substrate using a blade coater such that the blade coater urges the basecoat into the pits and crevices in the substrate while removing the basecoat from the surface of the substrate. Specifically, as shown in FIGS. 9 and 10, the basecoat may be applied in a manner that is more akin to spackling, wherein substantially all of the basecoat resides in the pits and crevices in the surface of the substrate rather than on the surface of the substrate.

At this point, those skilled in the art will appreciate that when the disclosed basecoat is used in a blade coater the spacing between the moving substrate and the blade of the coater may be minimized to facilitate filling the pits and crevices in the surface without substantially depositing the basecoat on the surface of the substrate (i.e., forming a discontinuous film on the surface of the substrate). In other words, the blade of the coater may be positioned sufficiently close to the surface of the moving substrate such that the blade of the coater urges the basecoat into the pits and crevices in the surface of the substrate, while removing excess basecoat from the surface of the substrate.

EXAMPLE 1

A first pigment blend prepared according to an aspect of the present disclosure includes 50 percent by weight CARBITAL® 35 (coarse ground calcium carbonate) and 50 percent by weight XP-6100 (hyperplaty clay). In a stationary mixer, a coating formulation is prepared by combining the 50:50 pigment blend with water, latex binders and a thickening agent. The water is added in a quantity sufficient to form a slurry. Using a blade coater in the manner described above, the coating formulation is applied to raw paperboard stock having a basis weight of about 126 pounds per 3000 ft.sup.2 at the following coat weights: 6.7, 7.9, 8.9 and 11.3 pounds per 3000 ft.sup.2. Photographic results are shown in FIG. 3 and the PPS smoothness values are provided in FIG. 7 (data points marked with a circle).

Figure 2:
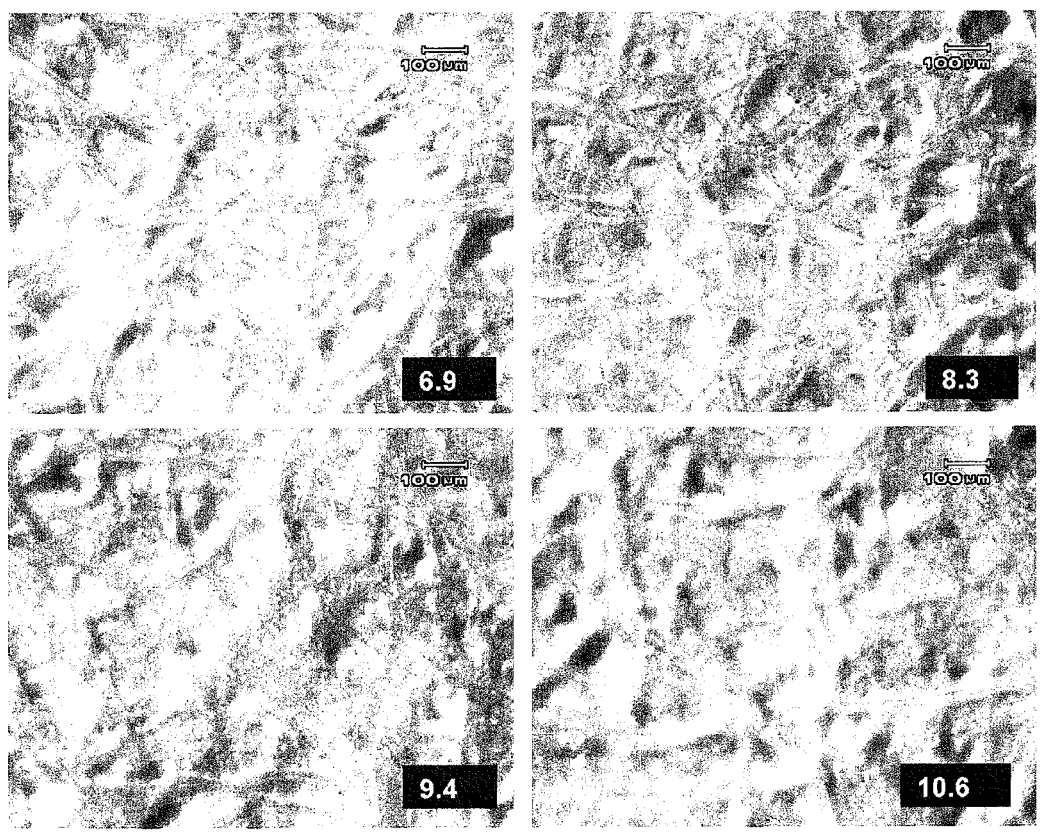
FIG. 2 is a photographic comparison of the surface of a paperboard substrate coated with various quantities (in pounds per 3000 ft.sup.2) of fine ground calcium carbonate according to the prior art.
Figure 3:
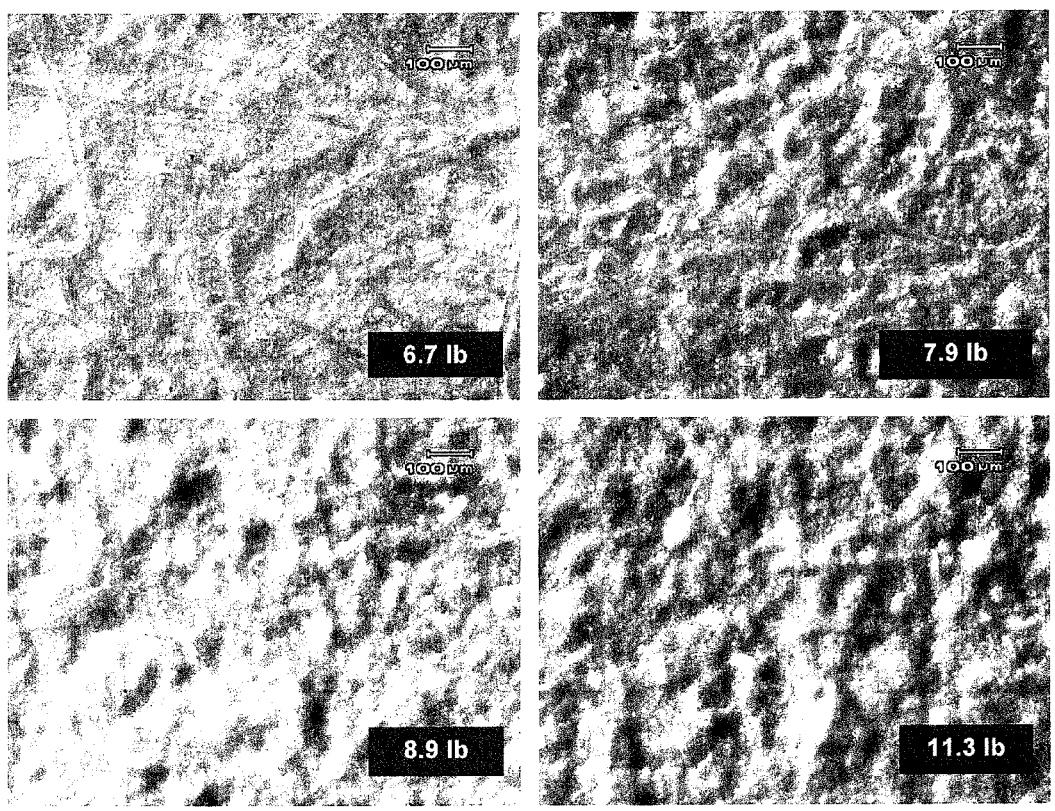
FIG. 3 is a photographic comparison of the surface of a paperboard substrate coated with various quantities (in pounds per 3000 ft.sup.2) of the disclosed basecoat.

Thus, as shown in FIG. 3, the disclosed basecoat and associated method provide optimum smoothness at relatively low coat weights. (Compare FIG. 2 to FIG. 3.) Specifically, the greatest smoothness is achieved at a coat weight of 6.7 pounds per 3000 ft.sup.2, with good smoothness achieved at 7.9 pounds per 3000 ft.sup.2, with less smoothness at 8.9 pounds per 3000 ft.sup.2, and even less smoothness at 11.3 pounds per 3000 ft.sup.2.

EXAMPLE 2

A second pigment blend prepared according to an aspect of the present disclosure includes 50 percent by weight OMYA HYDROCARB® 60 (coarse ground calcium carbonate available from Omya AG of Oftringen, Switzerland) and 50 percent by weight XP-6170 (hyperplaty clay available from Imerys Pigments, Inc.). In a stationary mixer, a coating formulation is prepared by combining the 50:50 pigment blend with water, latex and starch binders and a thickening agent. The water is added in a quantity sufficient to form a slurry. Using a blade coater in the manner described above, the coating formulation is applied to raw paperboard stock having a basis weight of about 106 pounds per 3000 ft.sup.2 at coat weights of 5.8 and 6.8 pounds per 3000 ft.sup.2, thereby providing paperboard structures with improved smoothness at relatively low coat weights.

Accordingly, at this point those skilled in the art will appreciate that basecoats formulated according to the present disclosure to include coarse ground calcium carbonate, particularly extra coarse ground calcium carbonate, and hyperplaty clay, particularly hyperplaty clays having aspect ratios in excess of about 70:1, and more particularly high aspect ratio clays having a relatively high average particle size (e.g., about 10 microns or more), provide increased surface smoothness at relatively low coat weights, particularly when applied to the substrate using the disclosed method.

While the pigment blends discussed above include platy clay and ground calcium carbonate, particularly coarse ground calcium carbonate, those skilled in the art will appreciate that alternative pigment blends may be used without departing from the scope of the present disclosure. For example, the pigment blend of the disclosed basecoat may include a platy clay and one or more additional inorganic pigments other than ground calcium carbonate, such as precipitated calcium carbonate, talc or kaolin clay.

Although various aspects of the disclosed basecoat and associated paperboard structure have been shown and described, modifications may occur to those skilled in the art upon reading the specification. The present patent application includes such modifications and is limited only by the scope of the claims.

The invention claimed is:

1. A method of preparing a basecoat, the method comprising:
   providing a pigment blend comprising a ground calcium carbonate component and a platy clay component, wherein at most 60 percent of the ground calcium carbonate component has a particle size smaller than 2 microns, wherein the platy clay component has an average aspect ratio of at least 40:1, and wherein the pigment blend has a sediment void volume of at least 45 percent;
   providing a carrier; and
   dispersing the pigment blend in the carrier;
   wherein the sediment void volume is measured by
   preparing a pigment blend sample having the desired weight percentage of the clay component to the calcium carbonate component;
   diluting the pigment blend sample with water to 50 percent by weight solids to provide a slurry;
   placing a 70 gram sample of the slurry into a centrifuge tube;
   spinning the sample at about 8000 g for about 90 minutes;
   removing the sample from the centrifuge;
   separating the clear supernatant liquid from the sample;
   weighing the clear supernatant liquid;
   determining the weight of water still contained in the voids of the sediment based on the weight of the clear supernatant liquid removed; and
   using particle densities, converting the weight of water in the voids into percent sediment void volume.

2. The method of claim 1, comprising the further step of providing at least one additional component and dispersing the at least one additional component in the carrier.

3. The method of claim 2, wherein the at least one additional component is selected from the group consisting of latex, starch, binders, stabilizers, dispersing agents, thickening agents, and additional pigments.

4. The method of claim 1, wherein the carrier comprises water in a quantity sufficient to form a slurry.

5. The method of claim 1 wherein the average aspect ratio of the platy clay component is at least 50:1.

6. The method of claim 1 wherein the average aspect ratio of the platy clay component is at least 70:1.

7. The method of claim 1 wherein the average aspect ratio of the platy clay component is at least 90:1.

8. The method of claim 1 wherein at most 35 percent of the ground calcium carbonate component has a particle size smaller than 2 microns.

9. The method of claim 1 wherein the ground calcium carbonate component is at least 10 percent by weight of the pigment blend and at most 60 percent by weight of the pigment blend.

10. The method of claim 1 wherein the pigment blend consists essentially of the platy clay component and the ground calcium carbonate component.

11. The method of claim 1, wherein the pigment blend has a sediment void volume of at least 47.5 percent.

12. The method of claim 11 wherein the pigment blend has a sediment void volume of at least 50 percent.

13. A method of preparing a basecoat, the method comprising: providing a pigment blend comprising a ground calcium carbonate component and a platy clay component, wherein at most 60 percent of said ground calcium carbonate component has a particle size smaller than 2 microns, wherein the ground calcium carbonate component is at least 25 percent by weight of said pigment blend and at most 60 percent of the pigment blend; wherein said platy clay component has an average aspect ratio of at least 40:1; wherein said pigment blend has a sediment void volume of at least 45 percent; providing a carrier; and dispersing the pigment blend in the carrier; wherein the sediment void volume is measured by preparing a pigment blend sample having the desired weight percentage of the clay component to the calcium carbonate component; diluting the pigment blend sample with water to 50 percent by weight solids to provide a slurry; placing a 70 gram sample of the slurry into a centrifuge tube; spinning the sample at about 8000 g for about 90 minutes; removing the sample from the centrifuge; separating the clear supernatant liquid from the sample; weighing the clear supernatant liquid; determining the weight of water still contained in the voids of the sediment based on the weight of the clear supernatant liquid removed; and using particle densities, converting the weight of water in the voids into percent sediment void volume.

14. The method of claim 13, comprising the further step of providing at least one additional component and dispersing the at least one additional component in the carrier, wherein the at least one additional component is selected from the group consisting of latex, starch, binders, stabilizers, dispersing agents, thickening agents, and additional pigments.

15. The method of claim 13, wherein the carrier comprises water in a quantity sufficient to form a slurry.

16. The method of claim 13, wherein the average aspect ratio of the platy clay component is at least 50:1.

17. The method of claim 13, wherein at most 35 percent of the ground calcium carbonate component has a particle size smaller than 2 microns.

18. The method of claim 13, wherein the ground calcium carbonate component is at least 10 percent by weight of the pigment blend and at most 60 percent by weight of the pigment blend.

* * * * *